United States Patent
Reddin et al.

[11] Patent Number: 5,947,432
[45] Date of Patent: Sep. 7, 1999

[54] HAIR DRYER HOLSTER DEVICE

[75] Inventors: Thomas C. Reddin, 5626 France Ave. South, Edina, Minn. 55410; Susan P. Martin, Wayzata, Minn.

[73] Assignee: Thomas C. Reddin, St. Louis Park, Minn.

[21] Appl. No.: 08/980,112

[22] Filed: Nov. 26, 1997

[51] Int. Cl.⁶ .................................................. F16B 47/00
[52] U.S. Cl. ........................................ 248/206.4; 248/314
[58] Field of Search .............................. 248/205.5, 206.4, 248/206.3, 314, 117.2, 117.3; 211/70.6, 87.01; 34/96, 97, 99, 101

[56] References Cited

U.S. PATENT DOCUMENTS

| | | | |
|---|---|---|---|
| 4,219,178 | 8/1980 | Assion | 248/314 |
| 4,225,106 | 9/1980 | Eplan | 248/309.1 |
| 4,453,695 | 6/1984 | Sennott et al. | 248/660 |
| 4,461,439 | 7/1984 | Rose | 248/51 |
| 4,696,447 | 9/1987 | Strecker | 248/206.3 |
| 4,746,090 | 5/1988 | Hamilton | 248/314 |
| 5,064,154 | 11/1991 | Payne | 248/314 X |
| 5,350,144 | 9/1994 | Lary | 248/183 |
| 5,359,461 | 10/1994 | Rice et al. | 359/874 |
| 5,613,660 | 3/1997 | Wyatt | 248/314 X |

*Primary Examiner*—Ramon O. Ramirez
*Attorney, Agent, or Firm*—Nilles & Nilles, S.C.

[57] ABSTRACT

A holster device for supporting a hand held type hair dryer is disclosed. The holster device includes a primary support for mounting the device to a support surface. The device also includes a pair of opposed flexible holster members which define a holster pocket therein. The holster pocket is adapted to receive a hair dryer handle therein to support the dryer in place. The holster members are relatively flexible to accommodate hair dryers of various shapes and sizes.

15 Claims, 3 Drawing Sheets

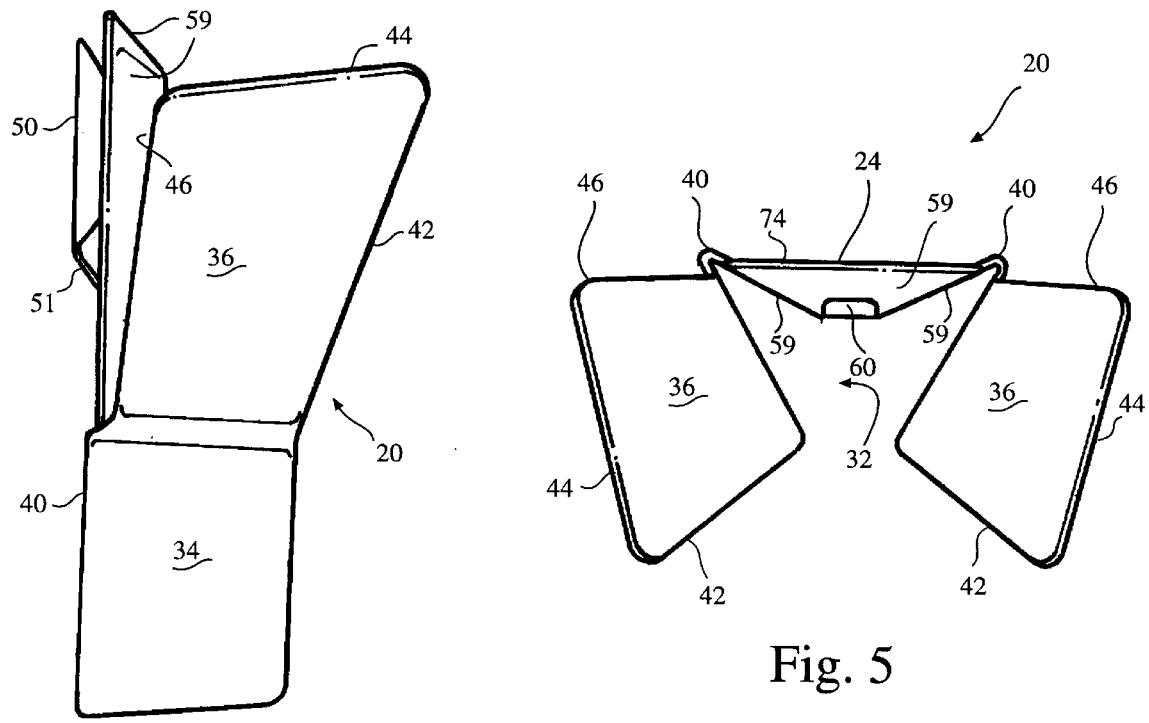
Fig. 4
Fig. 5
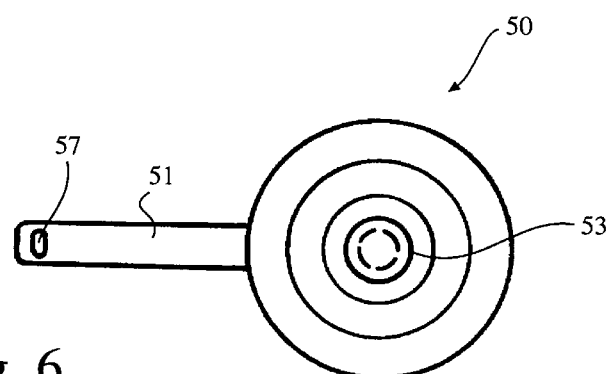
Fig. 6

HAIR DRYER HOLSTER DEVICE

FIELD OF THE INVENTION

The present invention relates to portable hair dryers, and more specifically to a hair dryer holster for supporting a hand held hair dryer while being stored or while in use permitting an individual to use both hands for styling their hair.

BACKGROUND OF THE INVENTION

Hand held hair dryers are a very common household appliance. Many people use a hair dryer to style their hair daily. Use of a hair dryer limits the user in their styling options and capabilities by requiring the user to hold the dryer with one hand and a comb, brush or other styling apparatus with the other.

Hair dryers are available in numerous sizes and styles, many of which are bulky and sometimes relatively cumbersome or heavy. This makes the dryer difficult to manipulate over an extended period of time for an average user when styling their own hair. A user whose arm becomes tired from holding the dryer may not satisfactorily complete their desired hair style. Also, as the appliance becomes heavy a user may accidentally touch their scalp, ear or neck with the hot appliance causing injury.

The motor or blower section of some of the larger sized hair dryers will not fit in a standard vanity cabinet drawer making storage of the product awkward when not in use. Such an appliance is often left sitting on the sink or vanity basin when not in use taking up counter space. Additionally, some typical bathrooms and salon work areas have extremely limited counter and drawer space. A user may wish to use the limited space for items other than a hair dryer.

What is needed is an apparatus for supporting a hand held hair dryer while the appliance is in use. Such an apparatus would free both of the user's hands for styling of their hair. A support apparatus is also needed which may act as a storage holder when the dryer is not in use. This would free up counter space usually needed for some of the larger appliances or drawer space often taken up by some of the smaller appliances. Such an apparatus would also prevent a user from accidentally injuring themselves with a hair dryer that would otherwise become heavy and cumbersome when held for an extended period of time.

SUMMARY OF THE INVENTION

The present invention teaches a hair dryer support apparatus or holding device in the form of a hair dryer holster which may be mounted to a bathroom door, mirror, vanity panel or other such surface. The holding device of the invention permits a user to style their hair using both hands while simultaneously drying their hair with the dryer. The holster also may be used to store the dryer when it is not in use.

In one embodiment, the hair dryer holster or holding device has a primary support for attaching the device to a surface such as a bathroom door, mirror, a vanity panel or the like. The primary support has a front surface and an opposite rear surface adapted to mount the device. The device also has a pair of holster members which define a holster pocket between them and in conjunction with the front surface of the primary support. The holster members each are connected to the opposed side edges of the primary support. The holster members extend forward from the front surface, each terminating at a free edge. The free edges of the holster members converge toward one another but are not joined to one another, thus permitting the holster members to expand apart relative to one another. Each holster member may also include an upper section which flares outward relative to the other to define a funnel entry into the holster pocket.

The holster members are flexible such that the free edges may flex toward and away from one another permitting the holster pocket to accommodate and receive therein hand held hair dryers of different sizes and configurations. The upper sections may be flexible outward relative to the lower sections to accommodate hair dryers having various blower motor or housing sizes as well.

In one embodiment, the hair dryer holster device is molded wherein the holster members and the primary support are integrally molded as a one-piece construction. Such a device is easy to install and use and inexpensive to manufacture. Thus the consumer will receive an inexpensive and useful product.

In other embodiments, the holster device may include one or more suction cups extending from the rear surface of the primary support for easily attaching the device to a smooth surface such as a mirror. The suction cup attachment permits easy installation and removal of the device. Alternatively, the device may include one or more mounting openings formed through the primary support for attaching the device with appropriate fasteners to a surface in a more permanent manner.

The holster device of the present invention is relatively inexpensive and simple to manufacture. The device is also relatively easy for a user to install. The device permits a user to simultaneously blow dry and style their own hair while using both hands for styling. The device also permits a blow dryer to be stored in the device freeing up counter or drawer space for other items.

BRIEF DESCRIPTION OF THE DRAWINGS

In the accompanying drawings, the preferred embodiments of the invention are illustrated:

FIG. 4 is a side elevational view of the holster device of FIG. 1.

FIG. 5 is a top elevational view of the holster device of FIG. 1.

FIG. 6 is a bottom elevational view of a suction cup used in conjunction with the holster device of FIG. 1.

DESCRIPTION OF THE PREFERRED EMBODIMENT

Figure 1:
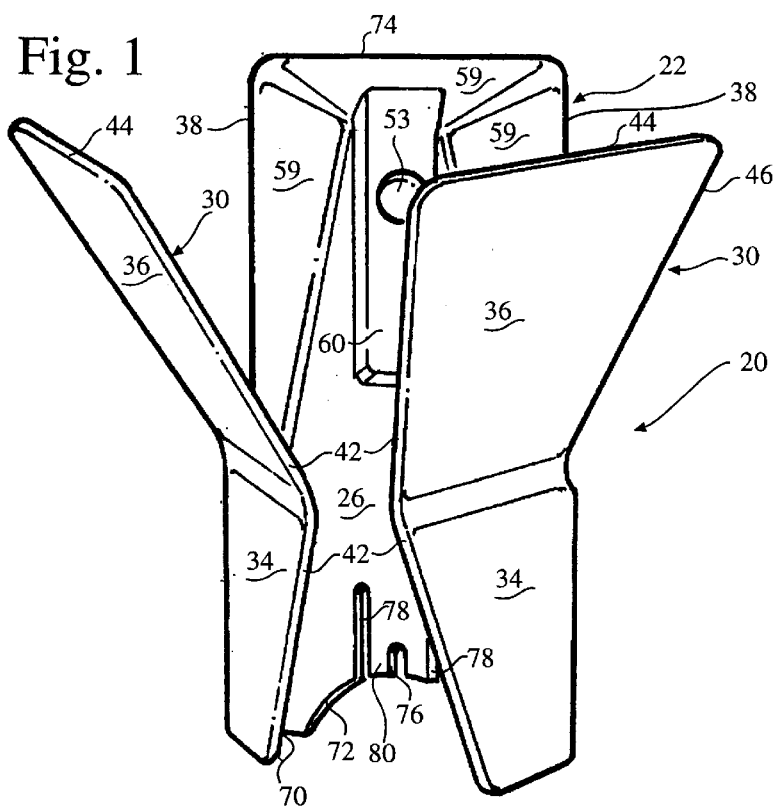
FIG. 1 is a view in perspective of a hair dryer holster device constructed according to one embodiment of the present invention.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Referring now to the drawings, FIGS. 1–5 illustrate one embodiment of a hair dryer holster or holding device constructed in accordance with the invention. The holster device 20 includes a primary support 22 for mounting the device to a surface, such as a bathroom door, mirror, vanity wall or the like. Support 22 includes a rear surface 24 which faces the surface to which device 20 is mounted and a front surface 26 opposite the back side.

Holster device 20 also includes a pair of holster members 30 which extend forward from front surface 26 of the primary support. Holster members 30 combine with front side 26 to define a holster pocket 32 for receiving therein a portion of a hair dryer assembly, such as a handle. Each holster member 30 in the present embodiment includes a lower section 34 and an integral upper section 36. The lower sections 34 are joined to device 20 along opposite side edges 38 of support 22 via a relatively flexible juncture 40, best illustrated in the top view of FIG. 5. Lower sections 34 bend inward from side edges 38 through flexible junctures 40 and converge toward one another. Each lower section 34 terminates along a free edge 42 of each holster member 30. The lower sections 34 as illustrated are essentially planar when viewed from the top or bottom but may alternatively be curved about a generally vertical axis to coincide with the contour of a particular hair dryer handle or the like which is received within holster pocket 32.

Upper sections 36 in the present embodiment are integrally formed with and extend upward from the lower sections 34. The perimeter of upper sections 36 are each generally defined by free edge 42 of holster members 30, a top edge 44, and a back edge 46 adjacent the primary support side edges 38. Each back edge 46 terminates and meets generally the upper end of each flexible juncture 40 connecting lower sections 34 to the primary support. In the present embodiment, upper sections 36 are flared generally outward away from one another defining a funnel entry 48 into the upper end of holster pocket 32. Upper sections 36 are shown having a generally planar construction but may also be curved or contoured as desired to follow the general contour of a particular hair dryer received within the pocket.

The embodiment of holster device 20 illustrated in FIGS. 1–5 is formed as a single one-piece structure. It is within the scope of the invention that the device may be produced wherein the support and holster members are each constructed as single or multi-piece independent components. However, in one embodiment, device 20 of the present invention is molded utilizing a conventional process, such as injection molding, from a relatively sturdy yet somewhat flexible and resilient material, such as a conventional thermoplastic. It is preferred that the respective free edges 42 of the holster members 30 be capable of flexing away from one another to expand the volume of holster pocket 32 so that device 20 may accommodate hair dryers of different shapes and sizes. It is also preferable that upper sections 36 be capable of flexing outward relative to lower sections 34 with respect to a vertical axis. This is preferred so that device 20 may accommodate hair dryers of various blower motor size and volume. The holster members 30 must, however, have enough rigidity to support a conventional hair dryer assembly when installed.

Figure 3:
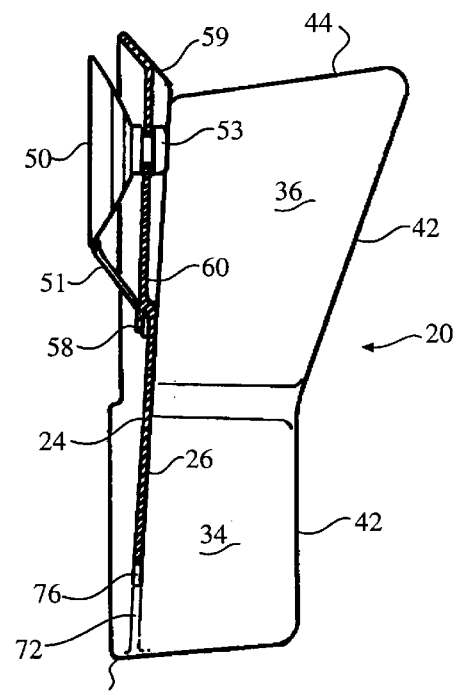
FIG. 3 is a side view in cross section of the holster device taken along line 3—3 of FIG. 2.

As shown in FIGS. 3 and 6, a first suction cup 50 is disposed towards the upper end of primary support 22 and extends rearward from back side 24. Suction cup 50 is one of many possible embodiments for mounting holster device 20 to a mounting surface such as a mirror. By disposing first suction cup 50 towards the upper end of support 22, the holster device 20 is prevented from cantilevering or rocking forward relative to the lower end of primary support 22 when supporting the weight of a hair dryer. As shown in FIG. 6, suction cup 50 may include an integral tether 51 extending from the edge of the suction cup and having a tab opening 57 formed in its distal end. As shown in FIG. 3, a corresponding tab 58 extending from back side 24 of support 22 is received through tab opening 57. Tether 51 aids in removing device 20 from a mirror or the like. To remove the device, one need only pull support 22 the device from the bottom end stretching tether 51 which in turn will pull on the edge of the suction cup to release the vacuum seal.

Figure 7:
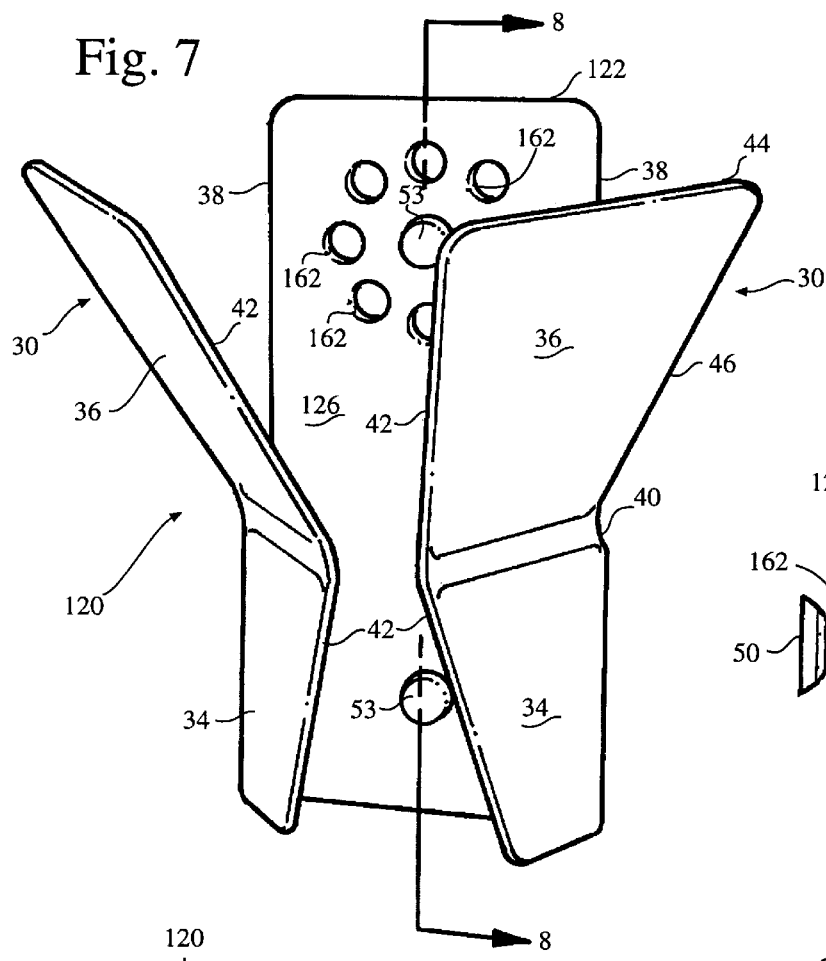
FIG. 7 is a view in perspective of a hair dryer holster device constructed according to another embodiment of the present invention.
Figure 8:
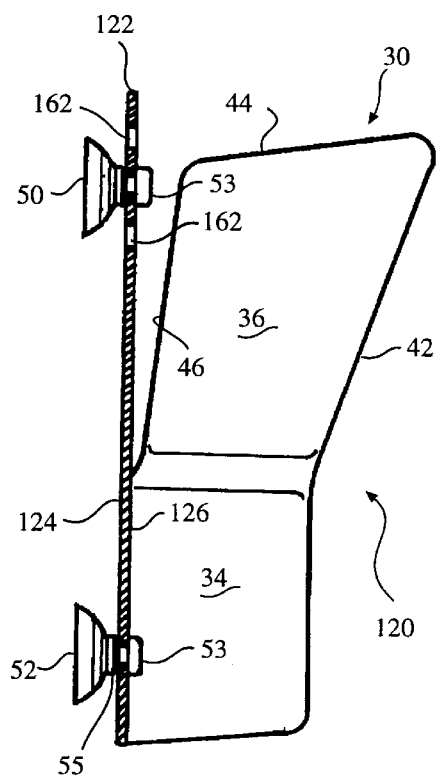
FIG. 8 is a side view in cross section of the holster device taken along line 8—8 of FIG. 7.
Figure 9:
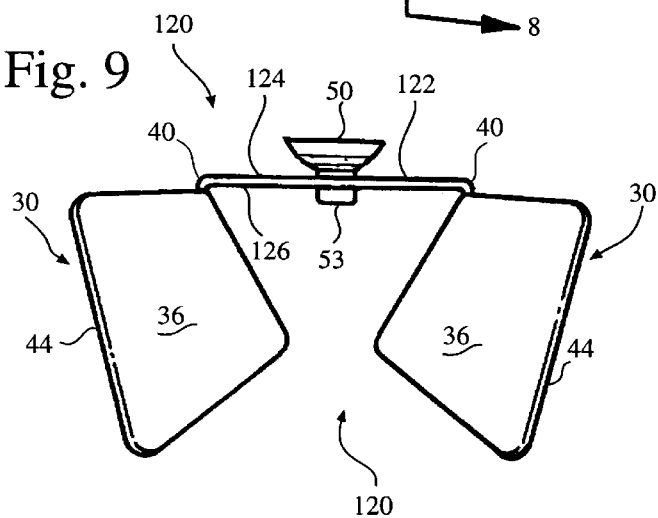
FIG. 9 is a top elevational view of the holster device of FIG. 7.

If desired, a second suction cup may be disposed near the lower end of support 22 extending rearward from back side 24. An example of a second suction cup is shown in the embodiment of FIGS. 7–9 and identified as second suction cup 52 therein. The second cup is utilized to help stabilize holster device 20 when supporting a hair dryer.

As illustrated in FIG. 3, each suction cup preferably includes an over-sized bulb 53 which is inserted and forced through a corresponding opening 55 formed for each cup in support 22. As will be evident to those skilled in the art, the suction cups may be attached to holster device 20 using means other than over-sized bulb 53 but must be sufficient to adequately support the weight of holster device 20 and a conventional hair dryer assembly. Alternatively, other means may be used to mount holster device 20 to a support surface, such as affixing the holster device to a wall, door, or vanity panel using conventional screw-type fasteners inserted through each opening 55. Also, one or more hook-like devices or members may be formed on the upper end of the primary support for merely hanging the device on an edge of a mirror, door or other such support surface.

Conventional hand held hair dryer assemblies typically include one or more intake air openings in the hair dryer housing. Air is drawn into the openings and then typically delivered to an electric motor and blower assembly which heats and delivers the air at a high velocity to an output nozzle.

In the present embodiment, support 22 generally has a vertically oriented rectangular profile when viewed from the front or back side. Rear surface 24 and front surface 26 follow the same contour in cross section as shown in FIG. 3 but are not planar in this embodiment. As will be evident those skilled in the art, support 22 may comprise a perimeter configuration other than a generally rectangular shape without departing from the scope of the invention. Additionally, the contour of support 22 defined by the contour of rear surface 24 and front surface 26 may also comprise other contours such as the planar or flat construction shown in FIGS. 7–9. For example, the primary support may be contoured to mount to and mate with a particularly odd shaped surface, as desired.

As is illustrated in FIGS. 1, 3 and 5, primary support 22 of the present holster device has a concave contour. The front and rear surfaces are bowed toward the holster members moving inward from the perimeter toward the middle of the support. This particular configuration thus defines sloping surfaces 59 on front surface 26 which displace holster pocket 32 away from the mounting surface. The sloped surfaces 59 allow air to flow between front surface 26 and the hair dryer preventing blockage of the dryer's air intake openings. If the air intakes of the blow dryer assembly were blocked completely or partially, the motor and blower assembly could overheat from lack of sufficient air volume, causing damage to the unit or perhaps injury to the user.

Also as illustrated in FIGS. 1, 3 and 5, a recess 60 is formed centrally on front surface 26 extending back toward rear surface 24. Recess 60 surrounds openings 55 through which over-sized bulb 53 extend. Preferably, recess 60 is of sufficient depth to prevent over-sized bulb 53 from extending into holster pocket 32. Over-sized bulb 53 will thus not interfere with insertion of a hair dryer into the pocket. Recess 60 and sloping surfaces 59 in combination with the concave contour of primary support 22 adds structural rigidity to the device.

Figure 2:
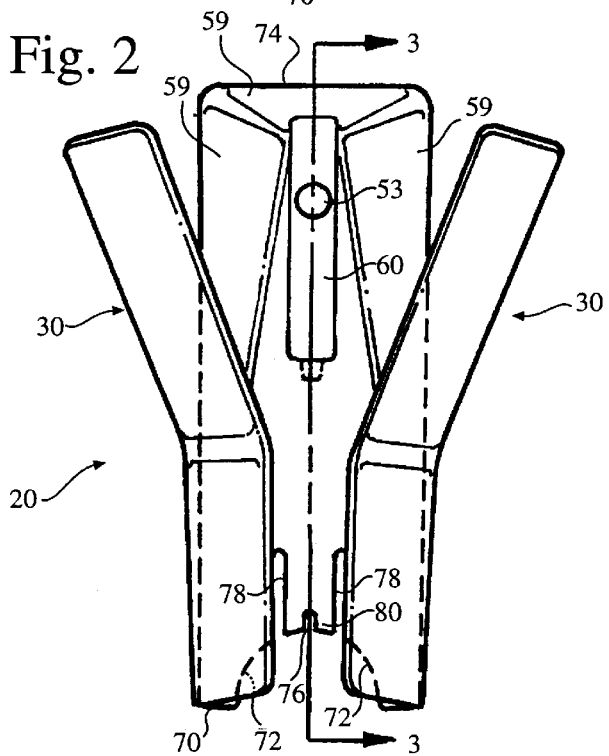
FIG. 2 is a front view of the holster device of FIG. 1.

As illustrated in FIGS. 1 and 2, the bottom perimeter edge 70 of support 22 may include an arcuate cut out portion 72 therein which converts device 20 to a useful storage holder when the device is not secured to a vertical surface. The device 20 may be inverted and set on a counter top or other horizontal surface and will rest on a top perimeter edge 74 of support 22 and the upper section top edges 44 of holster members 30. Cut out 72 is adapted for receiving and supporting a portion of a hair dryer such as the nozzle section. The dryer will simply rest on the counter top supported by device 20.

As best shown in FIG. 2, a slot 76 may be formed in arcuate cut out 72 extending further into support 22. Slot 22 is for alternatively receiving therethrough a conventional fastener for permanently mounting device 22 and securing the lower portion of device 20. An upper fastener would be inserted through opening 55 as described above in lieu of a suction cup to secure the upper portion of device 20 to a vertical surface. To prevent support 22 from cracking if secured by a fastener driven into slot 76, relief cutouts 78 may be added adjacent v either side of the slot. Relief cutouts 78 create a bendable tab 80 defined therebetween which bends independent of the remaining structure of primary support 22.

FIGS. 7–9 illustrate an alternative embodiment of a hair dryer holster device 120. The holster members of device 120 are essentially the same as for device 20 and have therefore been given the same references numbers in the present embodiment. In this embodiment, device 120 includes an alternative primary support 122 of a vertically oriented rectangular construction. Support 120 has a rear surface 124 and a front surface 126 substantially planar and parallel to one another. As will be evident to those skilled in the art, support 122 may again comprise a perimeter configuration other than a generally rectangular shape.

To accommodate the hair dryer air intake requirements discussed above, primary support 122 of holster device 120 may include one or more air intake vents 162 disposed throughout its surface area for preventing blockage of all or part of the hair dryer air intakes. Additional air intake vents may also be included on the holster members 30 as desired. Intake vents 162 may similarly be added to device 20 described above.

Holster devices 20 and 120 of the present invention may alternatively be mounted to a portion of an adjustable carrier (not shown) wherein the adjustable carrier is affixed to a support surface and the holster device primary support is attached to the adjustable carrier. Such a construction would allow a user to remain stationary and yet adjust the position and blowing direction of the hair dryer as desired for a particular hair style. An adjustable carrier structure may be of a type merely permitting a first degree of adjustment, such as height adjustment or side-to-side adjustment of the holster device position. Alternatively, an adjustable carrier may be of a type permitting two degrees of adjustment, such as both height and lateral adjustment of the holster device position. Additionally, an adjustable carrier may be of a type permitting three degrees of articulation permitting both height and side-to-side adjustment and also forward and rearward adjustment relative to the support surface to which the adjustable carrier structure is mounted.

It is to be understood that the above description is intended to be illustrative, and not restrictive. Many other embodiments will be apparent to those of skill in the art upon reviewing the above description. The scope of the invention should, therefore, be determined with reference to the full scope of equivalents to which this provisional application is entitled.

What is claimed is:

1. A holding device for a hair dryer, the holding device comprising:
    a primary support positioned in a generally vertical orientation and having a front surface, a rear surface and a pair of side edges;
    an attachment mechanism for mounting the holding device to a surface;
    a pair of spaced apart flexible holster members extending forward relative to the front surface of the primary support from a respective one of the side edges, the holster members also extending toward one another and each terminating at a free edge;
    a flexible juncture joining each of the holster members to each side edge of the primary support; and
    a holster pocket defined between the front surface and the holster members.

2. The holding device of claim 1, wherein the holster members are integrally formed with the primary support.

3. The holding device of claim 1, wherein the attachment mechanism comprises: at least one suction cup carried on the rear surface.

4. The holding device of claim 3, further comprising:
    at least one opening formed in the primary support for receiving an over-sized bulb of a corresponding one of the at least one suction cup to attach each suction cup to the primary support.

5. The holding device of claim 3, further comprising:
    a tether on each of the at least one suction cup, each tether having a tab opening for connecting to a tab correspondingly formed on the rear surface of the primary support.

6. The holding device of claim 1, wherein the attachment mechanism further comprises:
    at least one opening formed in the primary support for receiving a corresponding fastener therethrough for mounting the holding device to a surface.

7. The holding device of claim 1, wherein the primary support further comprises:
    a concave configuration relative to the rear surface of the primary support.

8. The holding device of claim 1, further comprising:
    an arcuate cutout formed in a bottom edge of the primary support for supporting a portion of a hair dryer thereon when the holding device is inverted and rested on a horizontal surface.

9. The holding device of claim 1, further comprising: a plurality of air intake vents formed through the holding device.

10. The holding device of claim 9, wherein the air intake vents are formed through the holster members.

11. The holding device of claim 9, wherein the air intake vents are formed through the primary support.

12. A one-piece molded holding device for a hand held hair dryer, the holding device comprising:

a primary support positioned in a generally vertical orientation and having a front surface, a rear surface and a pair of side edges;

at least one suction cup extending from the rear surface of the primary support for mounting the holding device to a surface;

a pair of spaced apart flexible holster members integrally molded with the primary support and extending forward relative to the front surface from a respective one of the side edges, the holster members also extending toward one another and each terminating at a free edge;

an outwardly flared upper section of each of the holster members defining a funnel entry of the holster pocket; and a holster pocket defined between the front surface and the holster members.

13. The holding device of claim 12, wherein the holding device is injection molded from a thermoplastic material.

14. The holding device of claim 12, further comprising:

a structural reinforcing means on the primary support.

15. The holding device of claim 13, wherein the structural reinforcing means comprises:

a concave contour of the primary support relative to the rear surface.

* * * * *